United States Patent [19]

Van Duyn

[11] Patent Number: 4,527,861
[45] Date of Patent: Jul. 9, 1985

[54] ANTIGLARE REAR VIEW MIRROR

[75] Inventor: Paul D. Van Duyn, Anderson, Ind.

[73] Assignee: General Motors Corporation, Detroit, Mich.

[21] Appl. No.: 554,577

[22] Filed: Nov. 23, 1983

[51] Int. Cl.³ .............................................. B60R 1/04
[52] U.S. Cl. ............................................. 350/281
[58] Field of Search ..................................... 350/281

[56] References Cited

U.S. PATENT DOCUMENTS

| 3,253,510 | 5/1966 | Clayton | 350/281 |
| 3,472,580 | 10/1969 | Janosky | 350/281 |
| 3,508,815 | 4/1970 | Scheitlin et al. | 350/281 |
| 3,522,987 | 8/1970 | Janosky et al. | 350/281 |
| 3,525,564 | 8/1970 | Barton | 350/281 |

FOREIGN PATENT DOCUMENTS

| 137412 | 10/1950 | Australia | 350/281 |
| 221327 | 5/1959 | Australia | 350/281 |
| 644424 | 7/1962 | Canada | 350/281 |

Primary Examiner—John K. Corbin
Assistant Examiner—Rebecca D. Gass
Attorney, Agent, or Firm—Edward J. Biskup

[57] ABSTRACT

An antiglare rear view mirror having an actuator assembly which includes two parts, one of which has a reversely bent portion and is formed with integral spring arms, and the other of which is a finger-operated actuator member located within the reversely bent portion and has integral cam and tab members which allow the mirror to be tilted between a "day" position and a "night" position.

3 Claims, 6 Drawing Figures

ANTIGLARE REAR VIEW MIRROR

This invention concerns an antiglare rear view mirror of the type which includes a tiltable prismoidal mirror element having two reflecting surfaces of different reflecting powers that are selectively tilted to present one or the other for viewing.

More specifically, the antiglare rear view mirror according to the present invention includes a housing which has the prismoidal mirror element secured thereto and has a back wall integrally formed with forwardly projecting upper and lower flange members. The back wall of the housing is formed with a first aperture through which one end of a ball support extends into the interior of the housing for pivotal connection with an actuator assembly. The actuator assembly comprises a sheet metal body portion having one part thereof contacting the rear of the ball support and another part thereof reversely bent and contacting the front of the ball support so as to connect the body portion to the ball support for relative pivotal movement thereabout. The body portion also includes a pair of laterally spaced spring arms connected to the back wall of the housing for allowing the latter to pivot about a first horizontal axis relative to the body portion. An actuator formed as an elongated cylindrical member is located in the reversely bent portion of the body portion for rotation about a second horizontal axis and includes a tab member which extends through a second aperture formed in the lower flange member so as to be accessible for manual movement between first and second positions. In addition, a cam is formed on the actuator and contacts the lower portion of the back wall whereby movement of the tab member between the first and second positions causes the cylindrical member to rotate about the second horizontal axis with resultant pivotal movement of the housing about the first horizontal axis so as to present one or the other of the two reflecting surfaces to the viewer.

The objects of the present invention are: to provide a new and improved antiglare rear view mirror having two reflecting surfaces and which includes a housing having an actuator assembly comprising a first part that contacts the rear of a ball support and a second part that is reversely bent for carrying an actuator and for contacting the front of the ball support so as to connect the body portion to the ball support for relative pivotal movement thereabout; to provide a new and improved antiglare rear view mirror having an actuator assembly that is simple and inexpensive to manufacture and consists of two parts, one of which is a sheet metal stamping integrally formed with a pair of spring arms and the other of which is a plastic actuator formed with a cylindrical member adapted to be carried by a reversely bent portion of the stamping and has integrally formed cam and tab members which allow the mirror to be tilted between a "day" position and a "night" position; to provide a new and improved antiglare rear view mirror having a housing connected to and supported by an actuator assembly that includes a sheet metal stamping which has one part integrally formed with a pair of laterally spaced spring arms located on opposite sides of a keyhole-shaped slot and another part which is centrally dimpled and adapted to be reversely bent 180° about a ball support so as to allow the housing to be pivotally adjustable thereabout; and to provide a new and improved antiglare rear view mirror having a housing supported by an actuator assembly which includes a single piece sheet metal stamping that has a pair of integral tangs for maintaining an actuator formed with a cylindrical member within a reversely bent portion of the stamping so as to allow a fingeroperated tab member secured to the cylindrical member of the actuator to rotate the latter for positioning the mirror between a "day" position and a "night" position.

Other objects and advantages of the present invention will be apparent upon reading the following detailed description when taken with the accompanying drawings, in which.

Figure 1:
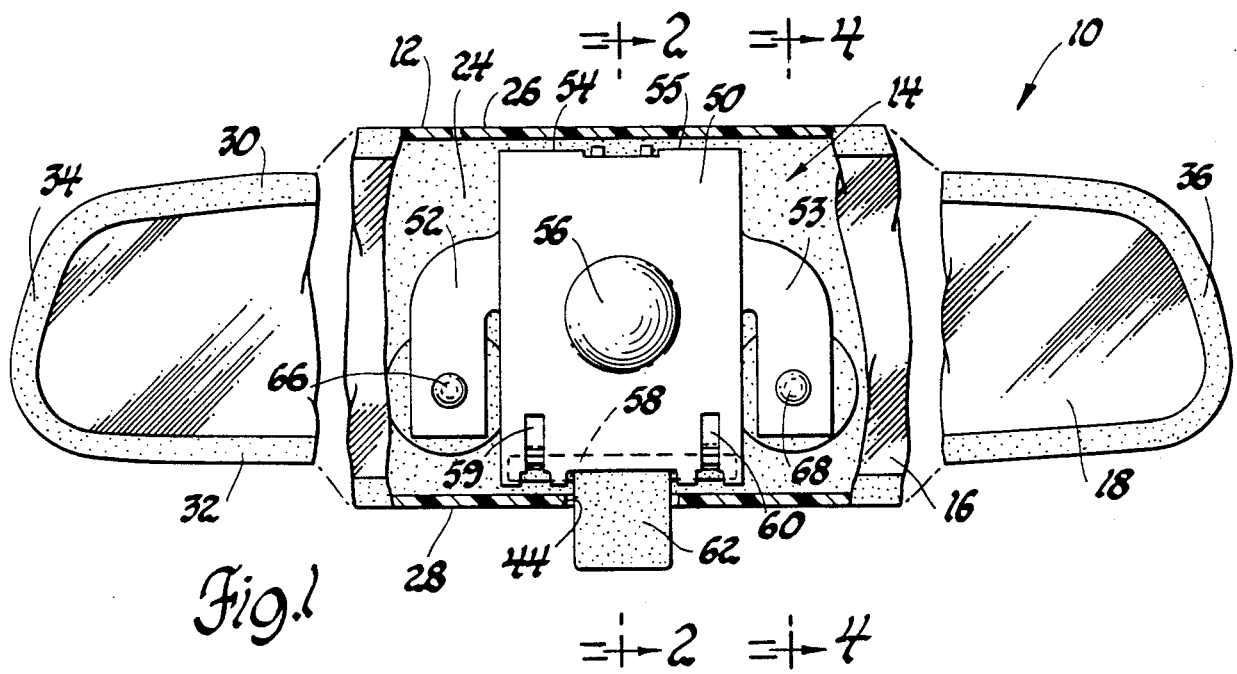
FIG. 1 is a front elevational view of an antiglare rear view mirror made in accordance with the present invention.

Referring to the drawings, an antiglare rear view mirror 10 is shown comprising a housing 12, an actuator assembly 14 and a mirror 16. The antiglare rear view mirror 10 provides an arrangement wherein the housing 12 and accordingly the mirror 16 is selectively pivoted between two viewing positions, namely a "day" position which is used under conditions of normal visibility and a "night" position which is used to provide a rearward image of reduced intensity such as is desirable to reduce the headlight glare from a following vehicle.

The mirror 16 consists of a conventional prismoidal mirror element 18 that is generally wedgeshaped when viewed in transverse cross section. More specifically, the mirror element 18 includes upwardly diverging front and rear reflecting surfaces which are respectively identified by the reference numerals 20 and 22. The rear reflecting surface 22 is provided with a reflective coating formed by any suitable process, such as aluminizing. With this construction, different reflecting powers are provided by the front reflecting surface 20 and the rear reflecting surface 22. Preferably, the front reflecting surface 20 has an approximate 4% reflectivity, while the rear reflecting surface 22 has approximately a 90% reflectivity. Therefore, by manually selectively positioning the mirror element 18, the operator of a vehicle can present for viewing the reflecting surface best suited to his immediate driving requirements.

Figure 2:
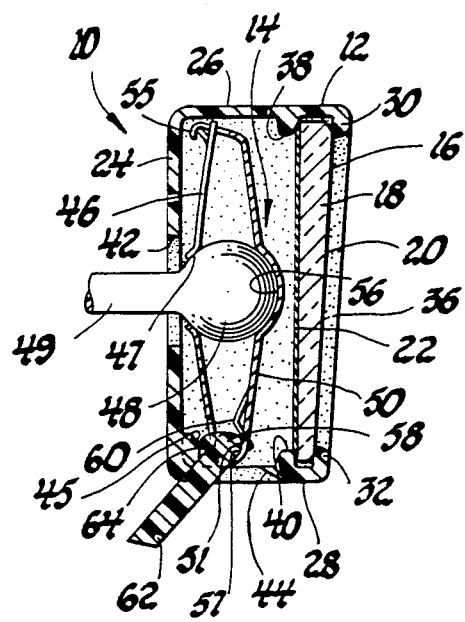
FIG. 2 is a sectional view of the antiglare rear view mirror taken on line 2—2 of FIG. 1, and shows the mirror in the "day" viewing position.

As best seen in FIGS. 1 and 2, the mirror element 18 is supported by the housing 12. The housing 12 is molded as a single piece from a plastic material and generally comprising a back wall 24 which is integrally formed with forwardly projecting upper and lower flange members 26 and 28 respectively. As best seen in FIG. 2, the upper and lower flange members 26 and 28 terminate with inwardly turned horizontal rim members 30 and 32, respectively, which extend the length of each of the associated flange members and connect with laterally spaced and substantially vertically oriented rim members 34 and 36 formed on the opposite ends of the housing 12, as seen in FIG. 1. The rim members 30, 32, 34, and 36 cooperate with radially inwardly projecting lips 38 and 40 respectively formed on the upper and lower flange members 26 and 28 to define a cavity which is slightly smaller in peripheral configuration than the mirror element 18. In assembly, the mirror element 18 is snapped into the cavity provided by the lips 38 and 40 and the rim members 30 and 32 and securely held therein by the resiliency of the flange members 26 and 28. It will be noted that a circular aperture 42 is formed in the back wall 24 and, in addition, the lower flange member 28 is formed with a rectangular aperture 44. Also, the back wall 24 adjacent the aperture 44 is formed with a projection 45 for purposes to be explained below.

Figure 5:
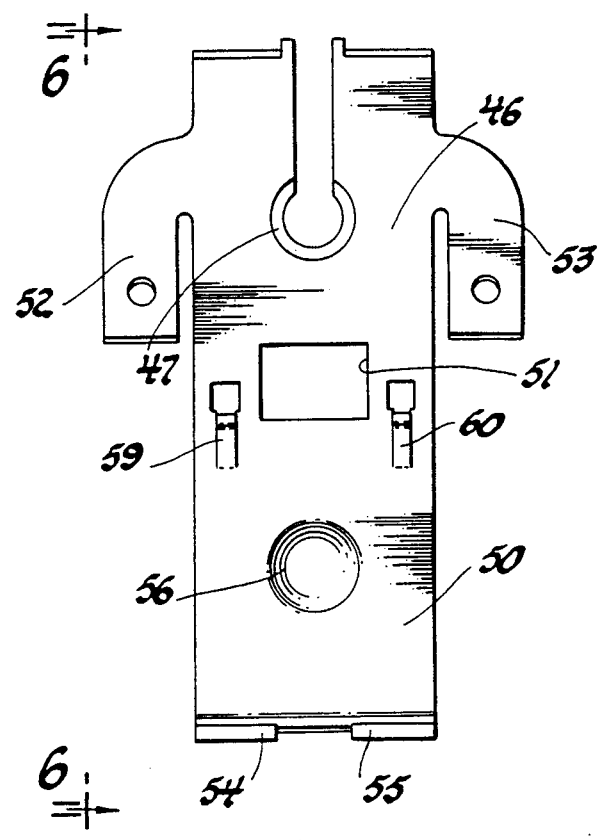
FIG. 5 is a view showing the body portion of the actuator assembly after it has been stamped and formed from a sheet metal blank.
Figure 6:
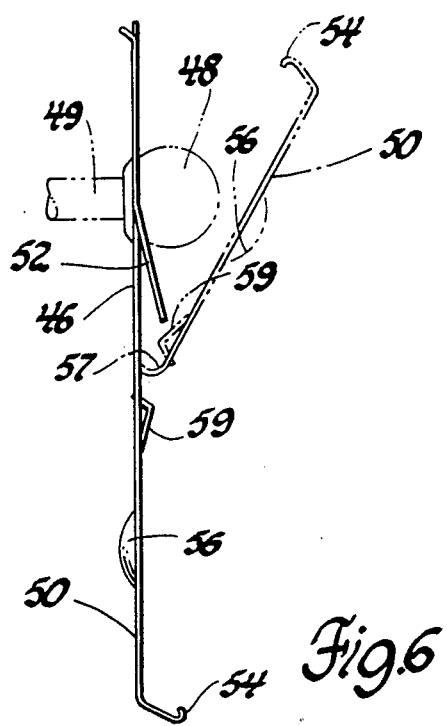
FIG. 6 is a side view of the body portion of FIG. 5 and illustrates in phantom lines the configuration assumed by the lower part thereof prior to hardening.

The actuator assembly 14 is located within the housing 12 and comprises a body portion which, as seen in FIG. 5 is initially formed from a sheet metal blank. As shown in FIG. 5, the upper part 46 of the body portion is provided with a keyhole opening which has a circular bearing surface 47 that, as seen in FIG. 6, is adapted to contact the rear of a spherical ball portion 48 of a support member 49 which serves to connect the antiglare rear view mirror 10 to the vehicle windshield (not shown). As seen in FIG. 5, the lower part 50 of the body portion is integral with the upper part 46 but is separated therefrom by a rectangular opening 51. In addition, the upper part 46 is integrally formed with a pair of laterally spaced spring arms 52 and 53 which, as seen in FIG. 6, are bent out of the plane of the upper part 46 for a purpose to be explained hereinafter.

Figure 3:
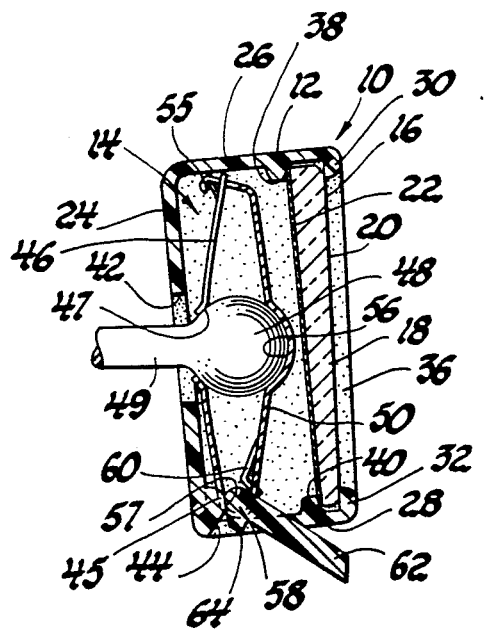
FIG. 3 is a view similar to FIG. 2, but shows the mirror in the "night" viewing position.
Figure 4:
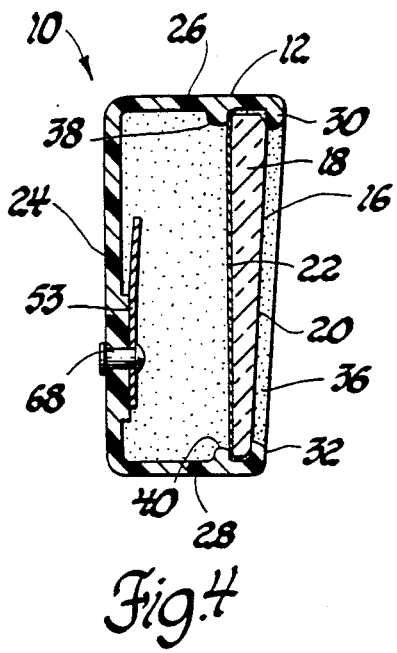
FIG. 4 is a sectional view taken on the line 4—4 of FIG. 1.

During manufacture, the lower part 50 of the body portion is reversely bent into the phantom line position of FIG. 6 and the body portion is then hardened. Afterwards and as seen in FIG. 6, the support member 49 and the body portion are assembled by first locating the stem portion of the support member 49 in the keyhole opening with the bearing surface 47 engaging the rear end of the spherical ball portion 48. The body portion is then joined to the support member 49 by locking the free end of lower part 50 to the free end of upper part 46 through a pair of clips 54 and 55 integrally formed with the part 50 that are snapped over the free end of part 46. In this position of the body portion, a concave bearing surface 56 formed in the part 50 received the front end of the spherical ball portion 48 and the part 50 is reversely bent 180° from the part 46 so as to define a semicircular pocket 57. As shown in FIGS. 2 and 3, the pocket 57 is adapted to support an actuator which includes a cylindrical member 58. The cylindrical member 58 is maintained within the pocket 57 by a pair of tangs 59 and 60 stamped out of and integral with the lower part 50 of the body portion. In addition, it will be noted that the cylindrical member 58 is integrally formed with a downwardly depending tab member 62 which extends through the opening 51. Also, a cam 64 is formed on the cylindrical member 56 which serves to properly position the housing 12 in the "day" viewing position and "night" viewing position as will be hereinafter explained.

As seen in FIG. 6 and as mentioned hereinbefore, prior to attachment to the back wall 24, the spring arms 52 and 53 are bent out of the plane of the part 46. As a result, when the arms 52 and 53 are connected by rivets 66 and 68 respectively, to the back wall 24 with the cylindrical member 58 of the actuator located in the pocket 57, the spring arms 52 and 53 bias the housing 12 in a counterclockwise direction about the spherical ball portion 50 so that the projection 45 is continuously in contact with the cylindrical member 58. Also, it will be noted that when the cylindrical member 58 of the actuator is located within the pocket 57 formed in the body portion, the tab member 62 of the actuator extends through the aperture 44 in the flange member 28 to a position exteriorly of the housing 12 and is readily accessible for manual movement between the "day" viewing position, as seen in FIG. 2, and the "night" viewing position, as seen in FIG. 3. In addition, the housing 12, through the body portion of the actuator assembly 14, is connected to the spherical ball portion 48 for universal movement thereabout.

As seen in FIG. 2, the antiglare rear view mirror 10 is shown positioned in the "day" viewing position to present the rear reflecting surface 22 to the viewer. During such time, the cam 64 on the cylindrical member 56 of the actuator contacts the abutment 45. When it is desired to move the antiglare rear view mirror 10 to the "night" viewing position so as to present the front reflecting surface 20 to the viewer, the tab member 62 is moved forwardly or in a counterclockwise direction about its central horizontal axis until the front edge of aperture 44 limits further movement at which time the tab member 62 will assume the position shown in FIG. 3. This movement of the tab member 62 causes the cylindrical member 56 to rotate about its horizontally oriented longitudinal axis so that the cam 64 is located below and out of contact with the projection 45. This then causes the housing 12 to tilt about a horizontal axis passing through the rivets 66 and 68 in a counterclockwise direction and to position the mirror element 18 so that the front reflecting surface 20 is then presented for rearward viewing. When the tab member 62 is returned to the FIG. 2 position from the FIG. 3 position, the rear edge of the aperture 44 limits further rearward movement of the tab member 62 and at the same time causes the cam 64 to again contact the projection 45 and tilt the housing 12 so as to present the rear reflecting surface 22 to the viewer.

Various changes and modifications can be made in this construction without departing from the spirit of the invention. Such changes and modifications are contemplated by the inventor, and he does not wish to be limited except by the scope of the appended claims.

The embodiments of the invention in which an exclusive property or privilege is claimed are defined as follows:

1. An antiglare rear view mirror comprising a housing supporting a mirror element having two reflecting surfaces of different reflecting powers, said housing including a back wall integrally formed with forwardly extending upper and lower flange members, said back wall having a first aperture formed therein, a second aperture formed in said lower flange member, a ball support extending through said first aperture into the interior of said housing, an actuator assembly in said housing comprising a body portion having a first part thereof contacting the rear of said ball support and a second part thereof reversely bent and contacting the front of said ball support so as to connect said body portion to said ball support for relative pivotal movement thereabout, said body portion having a pair of spring arms extending laterally therefrom and connected to said back wall for allowing said housing to pivot about a first horizontal axis relative to said body portion, an elongated cylindrical member located in a pocket formed by the reversely bent portion of said body portion for rotation about a second horizontal axis and being formed with a tab member which extends through the second aperture and is accessible for manual movement between first and second positions, a cam formed on said cylindrical member and contacting said housing whereby movement of said tab member between said first and second positions causes said cylindrical member to rotate about said second horizontal axis with resultant pivotal movement of said housing about said first horizontal axis so as to present one or the other of said reflecting surfaces to the viewer.

2. An antiglare rear view mirror comprising a housing supporting a mirror element having two reflecting surfaces of different reflecting powers, said housing including a back wall integrally formed with forwardly extending upper and lower flange members, said back wall having a first aperture formed therein, a second aperture formed in said lower flange member, a ball support extending through said first aperture into the interior of said housing, an actuator assembly in said housing comprising a single piece body portion having a first part thereof formed with a first bearing surface contacting the rear of said ball support and a second part thereof formed with a second bearing surface reversely bent and contacting the front of said ball support so as to connect said body portion to said ball support for relative pivotal movement thereabout, said body portion having a pair of spring arms connected to said back wall for biasing said housing in one direction and causing said housing to pivot about a first horizontal axis relative to said body portion, an elongated cylindrical member located in the reversely bent portion of said body portion for rotation about a second horizontal axis and being formed with a tab member which extends through the second aperture and is accessible for manual movement between first and second positions, a cam formed on said cylindrical member and contacting the lower portion of said back wall whereby movement of said tab member between said first and second positions causes said cylindrical member to rotate about said second horizontal axis with resultant pivotal movement of said housing about said first horizontal axis so as to present one or the other of said reflecting surfaces to the viewer.

3. An antiglare rear view mirror comprising a housing supporting a mirror element having two reflecting surfaces of different reflecting powers, said housing including a back wall integrally formed with forwardly extending upper and lower flange members, said back wall having a first aperture formed therein, a second aperture formed in said lower flange member, a ball support extending through said first aperture into the interior of said housing, an actuator assembly in said housing comprising a single piece sheet metal body portion having a first part thereof contacting the rear of said ball support and having a second part thereof reversely bent and contacting the front of said ball support so as to connect said body portion to said ball support for relative pivotal movement thereabout, said first part of said body portion having a pair of depending spring arms, means connecting said spring arms to said back wall so that said spring arms cause said housing to pivot about a first horizontal axis relative to said body portion, an elongated cylindrical member located in the reversely bent portion of said body portion for rotation about a second horizontal axis and being formed with a tab member which extends through the second aperture and is accessible for manual movement between first and second positions, a pair of tangs integral with said second part of said body portion for maintaining said cylindrical member within said reversely bent portion of said body portion, a cam formed on said cylindrical member and contacting the lower portion of said back wall whereby movement of said tab member between said first and second positions causes said cylindrical member to rotate about said second horizontal axis with resultant pivotal movement of said housing about said first horizontal axis so as to present one or the other of said reflecting surfaces to the viewer.

* * * * *